A. CARVER.
ROAD SCRAPER AND GRADER.
APPLICATION FILED JAN. 29, 1913.
1,084,534.
Patented Jan. 13, 1914.
2 SHEETS—SHEET 1.
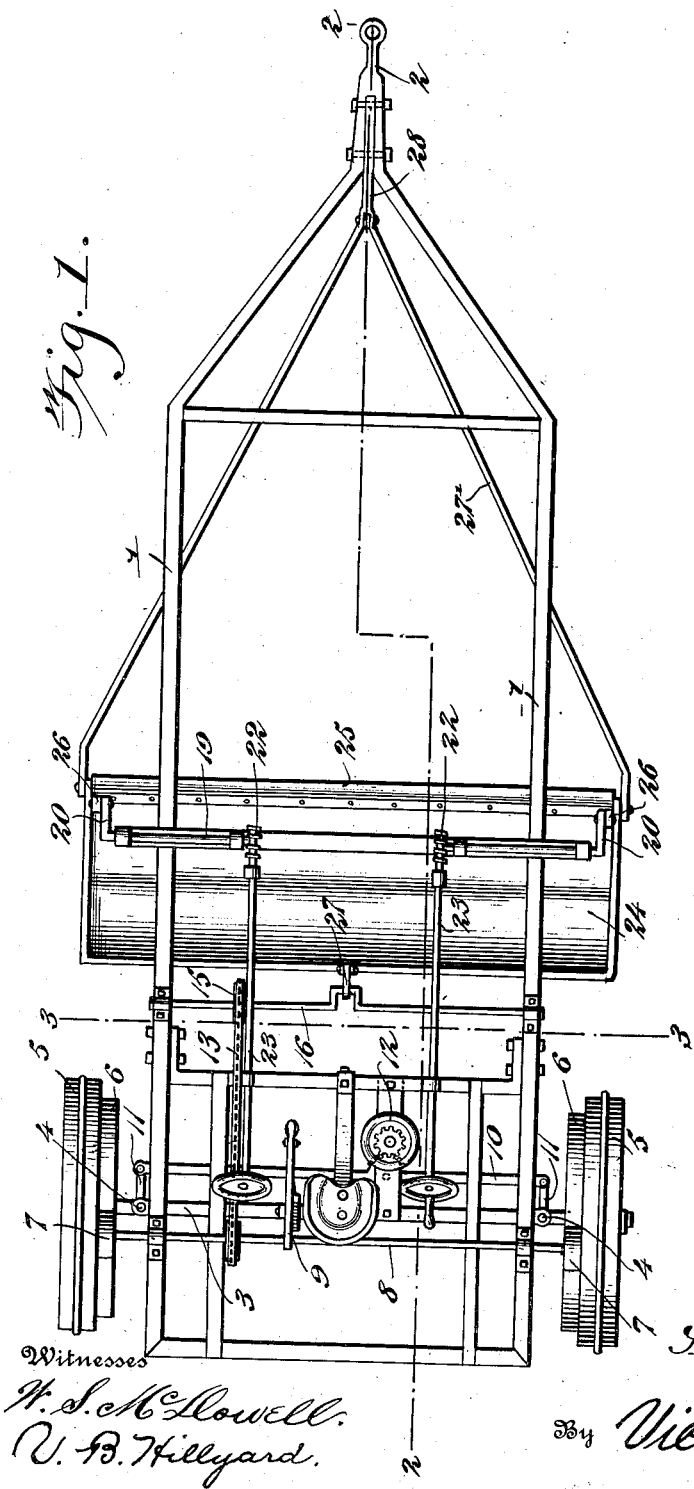

A. CARVER.
ROAD SCRAPER AND GRADER.
APPLICATION FILED JAN. 29, 1913.
1,084,534.
Patented Jan. 13, 1914.
2 SHEETS—SHEET 2.
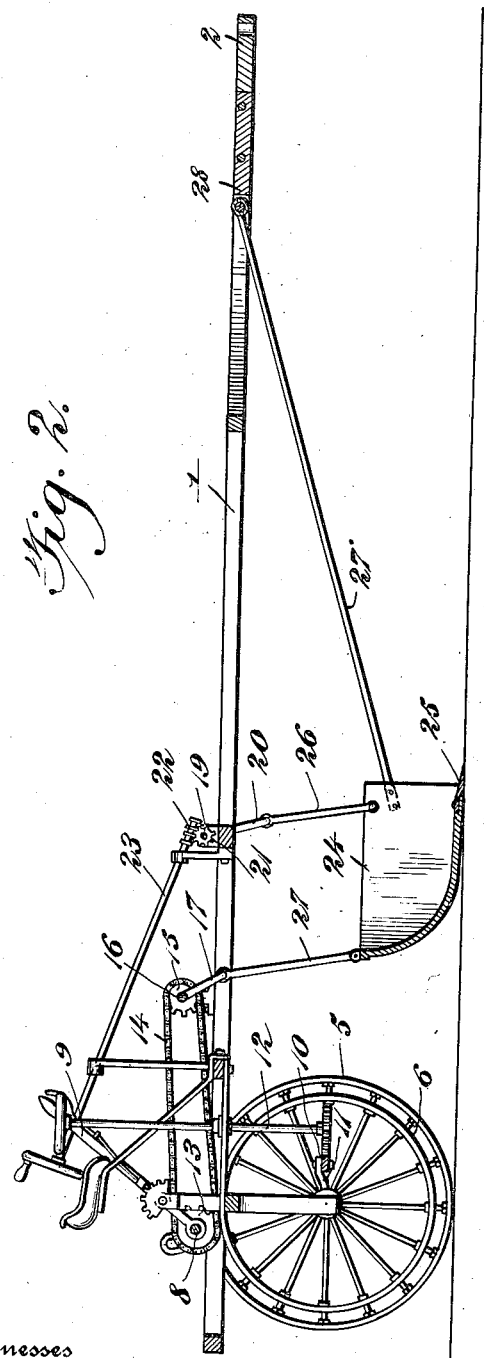
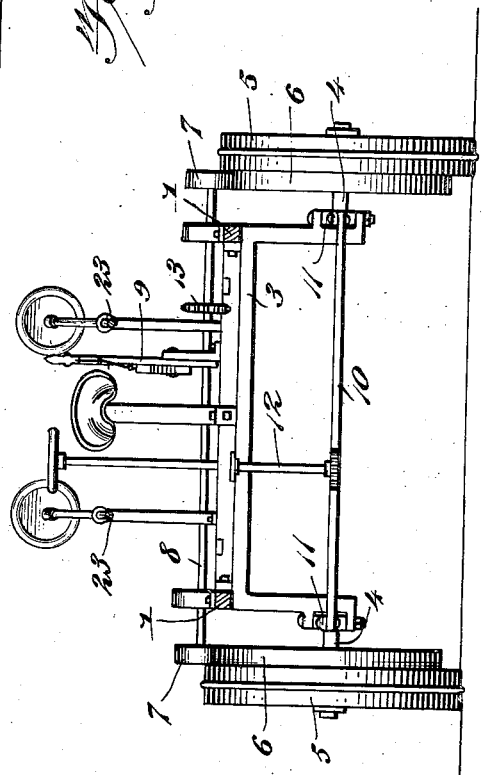
Witnesses
W. S. McDowell.
V. B. Hillyard.
Inventor
Ami Carver
By Victor J. Evans
Attorney

UNITED STATES PATENT OFFICE.

AMI CARVER, OF BANDON, OREGON.

ROAD SCRAPER AND GRADER.

1,084,534.   Specification of Letters Patent.   Patented Jan. 13, 1914.

Application filed January 29, 1913. Serial No. 744,956.

*To all whom it may concern:*

Be it known that I, AMI CARVER, a citizen of the United States, residing at Bandon, in the county of Coos and State of Oregon, have invented new and useful Improvements in Road Scrapers and Graders, of which the following is a specification.

The invention provides a machine adapted most especially for leveling and grading roadways, the construction being such as to admit of the interchange of a scoop and blade according to the special use for which the machine is to be adapted, such parts being adjustable at either end to suit the camber of the road or to remain parallel to a given position.

The invention provides novel means for adjusting and dumping the scoop, the latter operation being effected by power derived from the supporting wheels as tractors.

The invention further contemplates a machine of the character stated mounted upon wheels whose spindles are connected to the axle by metal joints and are adapted to be moved in substantially the same manner as the steering wheels of an automobile. A shaft is arranged in such relation as to receive power from the supporting wheels when the latter occupy a position to direct the machine straight ahead and at other times it being practically impossible to establish connection between said shaft and the supporting wheels, hence the scoop can be dumped only at such times when the machine is moving straight ahead.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a top plan view of a machine embodying the invention, showing it adapted for grading. Fig. 2 is a vertical longitudinal section on the line 2—2 of Fig. 1. Fig. 3 is a transverse section on the line 3—3 of Fig. 1.

Corresponding and like parts are referred to in the following description, and indicated in all the views of the drawings, by the same reference characters.

The main frame of the machine comprises longitudinal bars 1 which have their front portions converged and terminating in a clevis 2 to be coupled to a traction engine which is specifically designed to be used as the motive power for drawing the machine over the road. The rear axle is indicated at 3 and its arms or spindles 4 are connected thereto by knuckle joints in substantially the same manner as is common in the construction of automobiles and mechanically propelled vehicles. The supporting wheels 5 have friction rims 6 upon their inner sides arranged to engage friction wheels 7 secured to the outer ends of a shaft 8, which is mounted in the longitudinal bars 1 of the main frame parallel with the axle and in a manner to move vertically whereby the friction wheels 7 may be thrown into or out of engagement with the friction rims 6. The shaft 8 is adapted to be moved by means of an operating lever 9, which is mounted upon the main frame and extends within convenient reach of the operator. A rod 10 connects arms 11 extending from the inner ends of the spindles 4, said rod being moved by means of a steering post 12 which is connected thereto in any ordinary way. A sprocket wheel 13 is secured to the shaft 8 and a sprocket chain 14 connects it with a sprocket wheel 15 secured to a shaft 16, which is mounted in the longitudinal bars 1 parallel with the shaft 8 and axle 3. The shaft 16 has a crank 17 which is adapted to be connected with the rear portion of the scoop or the scraper according to which is in position.

Two shafts 19 are mounted upon end portions of a cross bar 18 each having a crank 20 at its outer end and a worm gear 21 at its inner end, said worm gear being in mesh with a worm 22 at the lower end of an upright shaft 23, the latter having a hand wheel at its upper end arranged conveniently to the operator. The cranks 20 at the outer ends of the shafts 19 are adapted to be connected in any manner with either the scoop or the scraper to admit of the same being adjusted vertically at one or both ends. The rear portion of the scoop or scraper is adapted to be connected to the crank 17.

The scoop is indicated at 24 and may be of any construction and is provided at its lower forward edge with a blade 25 detachably fitted thereto so as to be replaced when required. Links 26 connect the forward corner portions of the scoop 24 with the cranks 20 and a link 27 connects the rear portion of the scoop with the crank 17. When it is required to adjust one end only of the scoop one or the other of the shafts 23 is operated. When the scoop is to be adjusted so as to remain parallel to a given position both shafts 23 are operated. By adjusting opposite ends of the scoop independently it may be adapted to the camber of the road. The scoop is dumped by moving the shaft 8 to bring the friction wheels 7 into engagement with the friction rims 6, thereby causing the shaft 16 to rotate with the result that the rear portion of the scoop is elevated to such a height as to insure a dumping of the load. The friction wheels 7 can be engaged with the friction rims 6 at such times only as when the wheels 5 are in a position to direct the machine straight ahead. A bail 27 is connected to the ends of the scoop and extends forwardly to make connection with a draw-bar 28 which is attached to the clevis 2.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. In a machine of the character described the combination of a main frame, a scoop, a shaft having a crank portion connected with the scoop for dumping the latter, a second shaft having connection with the shaft having the crank and mounted to move vertically, friction wheels at the outer ends of the last mentioned shaft, supporting wheels mounted upon spindles having knuckle connection with the axle and provided with friction rims to engage with the said friction wheels, means for moving the said second shaft vertically to carry the friction wheels clear of the supporting wheels, and means for moving the supporting wheels for steering the machine.

2. In a machine of the character described, the combination of a main frame, a scoop, a shaft having a crank portion connected with the rear part of the scoop for dumping the latter, a second shaft connected with the first mentioned shaft and having friction wheels at its ends, supporting wheels mounted upon spindles having knuckle connection with the axle and provided with friction rims to engage with the friction wheels at such times only when the supporting wheels occupy a position to cause the machine to travel straight ahead, means for adjusting the supporting wheels to different angles, and means for moving the said second shaft to throw the friction wheels clear of the supporting wheels and into or out of engagement with the friction rims.

In testimony whereof I affix my signature in presence of two witnesses.

AMI CARVER.

Witnesses:
F. J. FEENEY,
ALFRED MORRAS.